United States Patent

Papenhagen et al.

[11] Patent Number: 5,855,146
[45] Date of Patent: *Jan. 5, 1999

[54] CONTROL PEDAL UNIT FOR A VEHICLE

[75] Inventors: Dieter Papenhagen, Walblingen; Manfred Löchle, Stuttgart; Thorsten Meyer, Fellbach, all of Germany

[73] Assignee: Mercedes-Benz AG, Stuttgart, Germany

[ * ] Notice: This patent issued on a continued prosecution application filed under 37 CFR 1.53(d), and is subject to the twenty year patent term provisions of 35 U.S.C. 154(a)(2).

[ * ] Notice: The term of this patent shall not extend beyond the expiration date of Pat. No. 5,806,376.

[21] Appl. No.: 692,497

[22] Filed: Aug. 5, 1996

[30] Foreign Application Priority Data

Aug. 29, 1995 [DE] Germany ............... 195 31 733.5

[51] Int. Cl.[6] ........................................... G05G 1/14
[52] U.S. Cl. ................................................ 74/560
[58] Field of Search .................... 74/512, 513, 514, 74/560

[56] References Cited

U.S. PATENT DOCUMENTS

| 3,451,288 | 6/1969 | Barton et al. | 74/512 |
| 4,637,741 | 1/1987 | Gillet | 74/512 X |
| 5,013,930 | 5/1991 | Spakowski et al. | 74/512 X |
| 5,398,569 | 3/1995 | Carr | 74/560 |
| 5,588,338 | 12/1996 | Carr et al. | 74/560 |

FOREIGN PATENT DOCUMENTS

| 0 430 600 | 6/1991 | European Pat. Off. . | |
| 28 15 769 | 10/1979 | Germany . | |
| 4112132 | 10/1991 | Germany | 74/512 |
| 4112133 | 10/1991 | Germany | 74/512 |
| 42 30 150 | 3/1993 | Germany . | |
| 94 09 892 | 9/1994 | Germany . | |
| 3161813 | 7/1991 | Japan | 74/560 |
| WO 94/29584 | 12/1994 | WIPO . | |

*Primary Examiner*—Charles A. Marmor
*Assistant Examiner*—Mary Ann Battista
*Attorney, Agent, or Firm*—Klaus J. Bach

[57] ABSTRACT

In a vehicle control pedal unit comprising a mounting structure having a U-shaped mounting end with spaced parallel leg walls between which one end of a pedal lever having an eyepiece with an opening is pivotally supported, a bearing sleeve is disposed between the leg walls and extends through the eyepiece opening and a slide hub extends through the bearing openings in the leg walls and through the bearing sleeve and is interlocked with the bearing sleeve for retaining the bearing sleeve and the lever arm in position between the leg walls of the mounting structure.

4 Claims, 3 Drawing Sheets

CONTROL PEDAL UNIT FOR A VEHICLE

BACKGROUND OF THE INVENTION

The invention resides in a control pedal unit for vehicles wherein a pedal lever is pivotally supported by a bearing structure and provided with a return spring acting on the pedal lever so as to bias it toward a rest position.

Basically, such control pedal units are known from DE OS 28 15 769 or DE OS 27 28 787. Also EP 04 30 600 B1 discloses such a control pedal unit for vehicles wherein a pedal is provided which is connected to a pedal lever. The pedal lever is engaged by a spiral return spring which biases the pedal lever toward a rest- that is its idle position. All the control pedal levers are mounted on a support structure which is attached to a vehicle wall.

However, the known control pedal units are relatively complicated and include a large number of components which are not very easy to assemble. Generally, the control pedal unit must be assembled from several components during assembly of the vehicle.

It is the object of the present invention to provide a pedal unit without the disadvantages mentioned above, particularly, a pedal unit which can be manufactured by efficient series manufacturing methods and which is suitable for preassembly. Also, the control unit should utilize the well known kinematics to which the drivers are used and it should be suitable for transmitting control impulses to the internal combustion engine electronically or electrically instead of via a mechanical control cable.

SUMMARY OF THE INVENTION

In a vehicle control pedal unit comprising a mounting structure having a U-shaped mounting end with spaced parallel leg walls between which one end of a pedal lever having an eyepiece with an opening is pivotally supported, a bearing sleeve is disposed between the leg walls and extends through the eyepiece opening and a slide hub extends through the bearing openings in the leg walls and through the bearing sleeve and is interlocked with the bearing sleeve for retaining the bearing sleeve and the lever arm in position between the leg walls of the mounting structure.

With the modular design according to the invention wherein a pedal and a pedal lever are both supported on a common mounting structure and one or several return springs are pre-installed in the control pedal unit the whole unit can be fully pre-assembled before it is installed in a vehicle.

In accordance with the invention, it is only necessary to mount the pre-assembled unit on a predetermined location in the vehicle which is normally the vehicle fire wall. The same control pedal unit may be used for an engine with manual transmission or one with automatic transmission. If the control pedal unit is used in connection with a normal transmission a simple stop is used for limiting the control lever movement in its end position; if it is used in connection with an automatic transmission a kickdown switch is used in place of the mechanical stop.

Advantageous embodiments of the invention are described below on the basis of the accompanying drawing.

DESCRIPTION OF A PREFERRED EMBODIMENT

Figure 1:
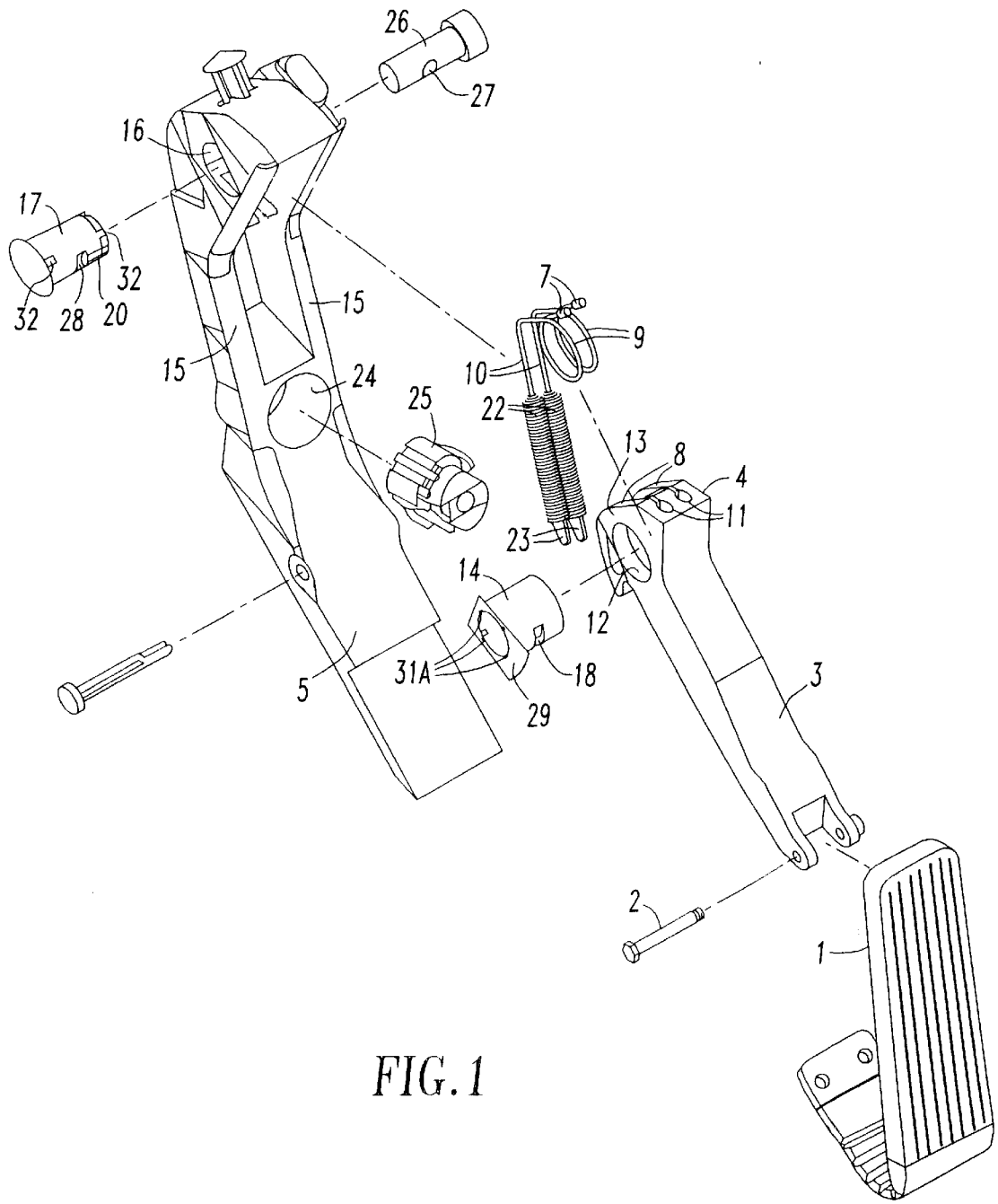
FIG. 1 is an exploded view of the control pedal unit according to the invention.

The vehicle control pedal unit includes a control pedal 1 which is connected to a pedal lever 3 by means of a hinge pin 2 in a well known manner. The pedal lever 3 has at its end opposite its hinge connection with the control pedal 1, an eyepiece 4 by which it is pivotally supported on a mounting structure 5 which is formed as a separate part. The eyepiece 4 is provided with partial circumferential slots 8 disposed side-by-side in parallel relationship and extending over part of the outer wall of the eyepiece 4 for receiving the end portions of connecting cables 10. The end of each connecting cable 10 forms a loop 9. By way of the loop 9, each connecting cable 10 passes from the outside, via a partially circumferential slot 8, to the inside of the eyepiece 4, that is into the eyepiece opening. The inner circumferential wall that is the wall defining the opening of the eyepiece 4 includes two circumferential grooves 12 which are in circumferential alignment with the partially circumferential slots 8. The two loops 9 of the connecting cables 10 are placed into the two circumferential grooves 12. The ends of the connecting cables 10 are provided with nipples 7 which are received and retained in corresponding cavities 11 formed in the outer circumferential wall of the eyepiece 4. The portions of the connecting cables 10 extending from the partial circumferential slots 8 are retained in guide slots formed in a rear portion of the eyepiece 4 which projects in the form of a cam structure 13.

After placement of the cable loops 9 into the inner circumferential grooves 12, a stationary bearing sleeve 14 is inserted into the eyepiece 4. The bearing sleeve 14 forms a friction sleeve between the loops 9 and the inner circumferential wall that is, the bearing opening of the eyepiece 4 of the pedal lever 3. The bearing sleeve 14 has an axial length which exceeds slightly the width of eyepiece 4. In this way, it is clamped between the legs 15 of the mounting structure 5 which, at least in the area in which the lever 3 is mounted, has the cross-sectional shape of a U. The sleeve 14 is therefore firmly retained between the legs 15 without any play. Then, a slide hub 17 is inserted into the bearing sleeve 14 through the opposite bearing opening 16.

For the accurate positioning of a window 18 formed in the bearing sleeve 14 through which a carrier pin 19 (FIG. 2) is inserted, the bearing sleeve 14 is provided, at its front end, with a frame-like positioning flange 29 by which the bearing sleeve 14 is properly located such that, during assembly of the bearing sleeve 14 and the pedal lever 3, the window 18 is in the proper position for inserting the carrier pin 19.

Figure 3:
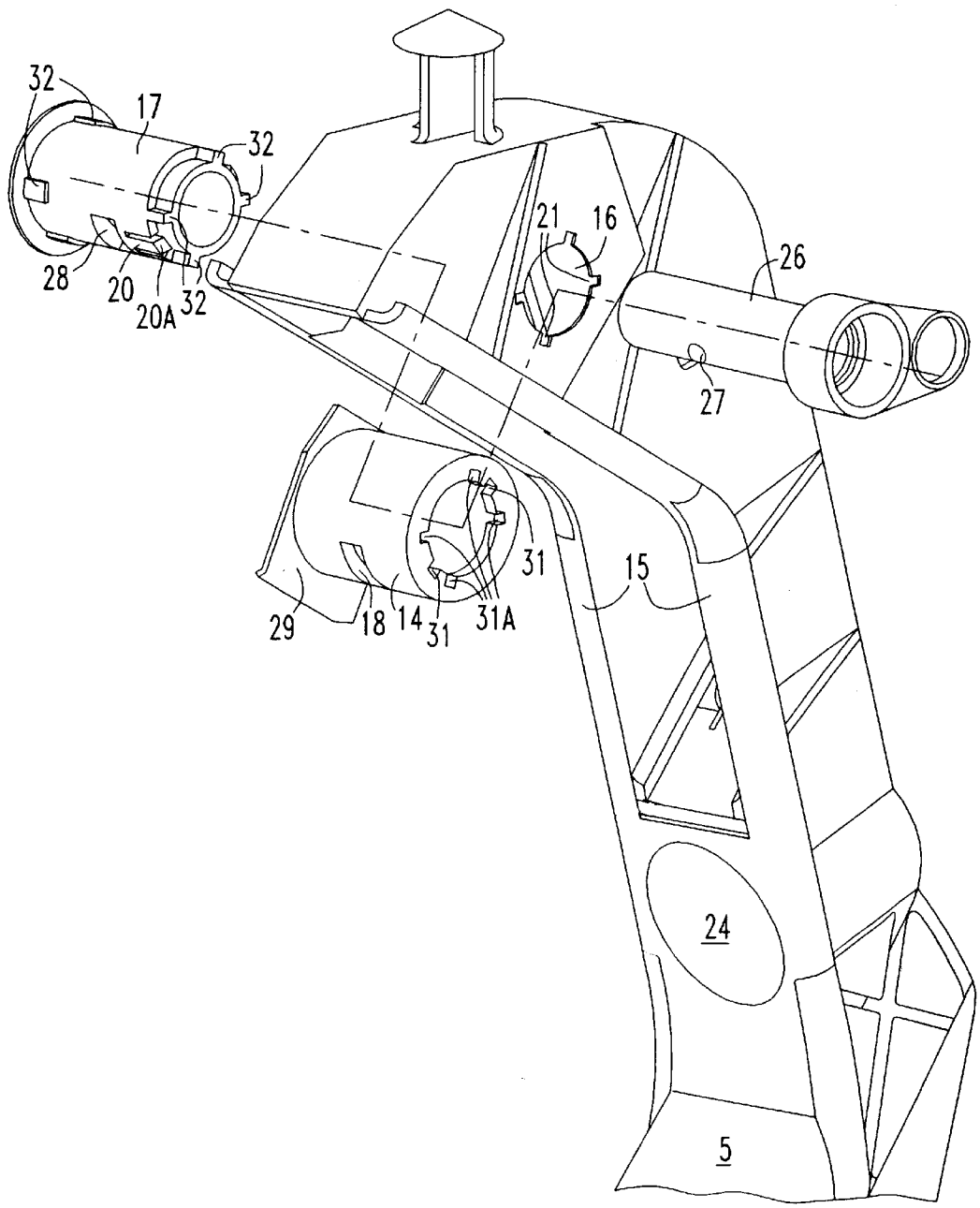
FIG. 3 is an enlarged view of the bearing portion supporting the pedal lever with the associated components.

In order to insure that the bearing sleeve 14 is retained in its proper position in which its functional features are properly coordinated with features of adjacent components, the slide hub 17 is provided with projections 20 and with stubs 32 and the projections are additionally provided with engagement lugs 20A. The inner end wall of the bearing sleeve 14 and the inner leg wall of the mounting structure 5 are provided, around the bearing opening 16, with cut-outs 21 and 31A (FIG. 3) which are adapted in size to the size of the stubs 32. For the interconnection of the pedal ever 3 and the mounting structure 5, the slide hub 17 can be inserted, during assembly, through the bearing opening 16 into the bearing sleeve 14 only in a predetermined angular position in which the projections 20 are received in the corresponding asymmetrically arranged cutouts 31 in the bearing sleeve 14 in which they are lockingly engaged. When the parts are assembled the stubs 32 are disposed in the cutouts 31A of the bearing sleeve 14 and also in the cutouts 21 of the bearing opening 16. In this way the bearing sleeve 14 as well as the slide hub 17 are firmly connected with the mounting structure 5 so as to be stationary. The ends of the cables 10 remote from the free end provided with the nipples 7 are connected to spiral return springs 22 which, at their free ends have hooks 23 by which the springs are engaged, under tension, with the support structure 5.

The mounting structure 5 is provided with a recess 24 for the reception of a kickdown switch 25 used in connection with vehicles with automatic transmissions.

Figure 2:
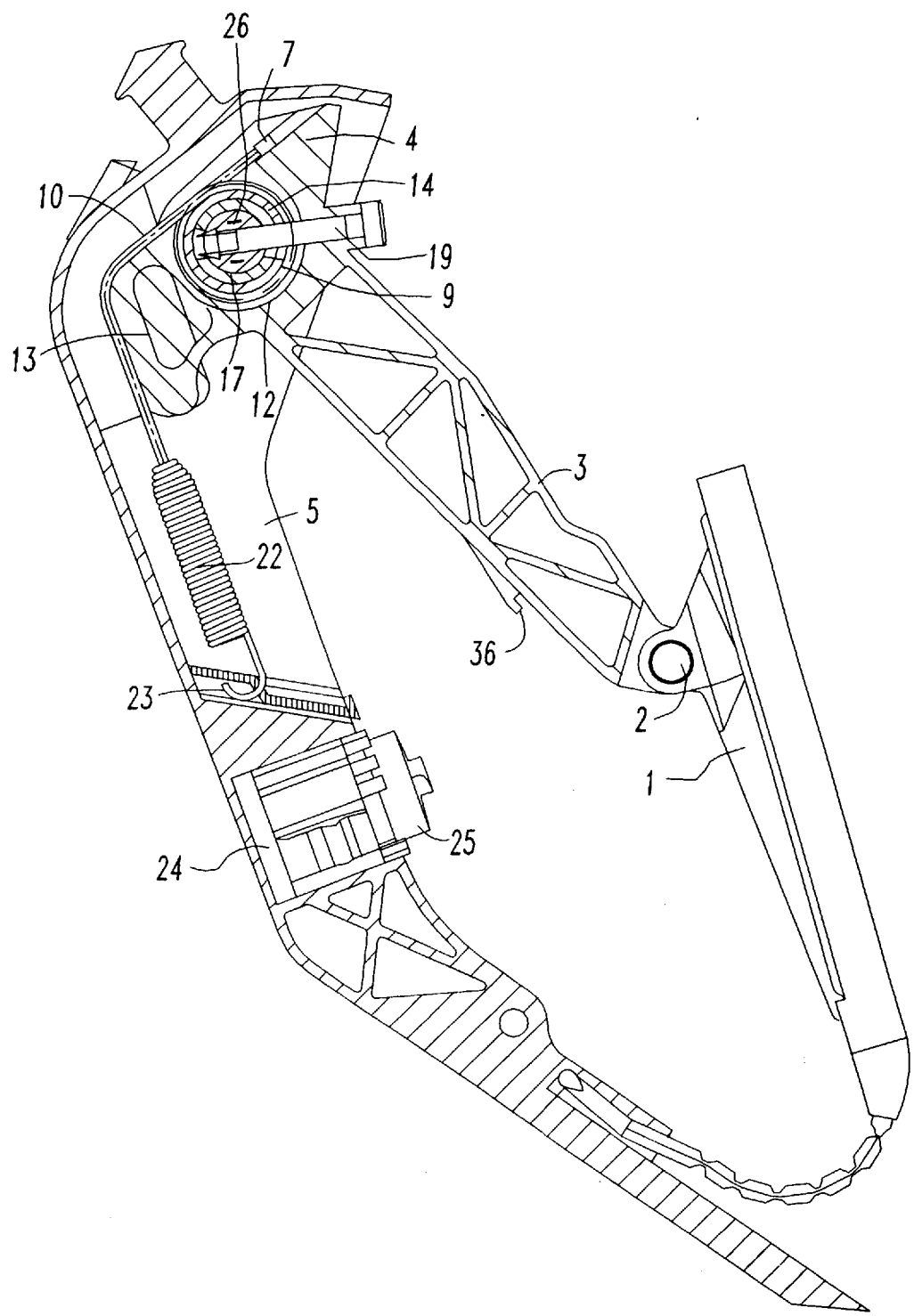
FIG. 2 is a side view of the control pedal unit of FIG. 1 shown partially in section.

The control pedal unit as shown in FIG. 2 is designed for electronic or electrical communication with a vehicle engine control unit. For this reason, a sender shaft 26 with an annular magnet is inserted into the slide hub at the end thereof opposite the insertion end. The sender shaft 26 may be a drive shaft for a potentiometer or a "Hall" sender capable of transmitting the angular position of the sender shaft 26 and, consequently, of the control pedal 1 electrically or electronically to the vehicle engine for controlling the engine.

For the connection of the pedal lever 3 with the sender shaft 26 a carrier pin 19 is mounted in a bore in the pedal lever 3. The carrier pin 19 may be threaded into a threaded bore 27 or it may be otherwise engaged in the bore 27 so as to be firmly mounted to the sender shaft 26. The slide hub 17 includes a window 28 which is in radial alignment with the window 18 in the bearing sleeve 14 and the carrier pin extends through the windows and is firmly connected to the pedal lever for movement therewith.

The two return springs 22 act in connection with the cables 10 as brakes so as to give the driver a corresponding driving feel.

The size of the two windows 18 and 28 is so selected that the carrier pin 19, and consequently the pedal lever 3, are freely movable between an upper stop which represents the idle position of the pedal lever and a lower stop which represents the full load position of the pedal lever.

The slide hub 17 serves two purposes: to mount the bearing sleeve 14 so that it is firmly located and to close the bearing sleeve 14 as it is held in the bearing sleeve in a simple manner by an engagement lock or by a clip connection and it serves as a friction bearing structure for the sender shaft 26. The slide hub 17 holds the bearing sleeve stationary, that is, it prevents it from moving out of position within the eyepiece opening.

As it is apparent, the pedal lever 3 and the mounting structure 5 are interconnected simply by inserting the bearing sleeve 14 and the slide hub 17 which are held in position by a snap lock. With the same procedure the two cables 10 and the return springs 22 are also properly positioned within the control pedal unit 5. It is then only necessary to attach the pedal unit 5 to the vehicle at a suitable location such as the vehicle fire wall.

The invention is not restricted to the exemplary embodiments described herein. It is for example, possible to use a mounting structure 5 wherein the control pedal is mounted on the pedal lever 3 and is not hinged at the lower end to the mounting structure or the vehicle floor.

What is claimed is:

1. A control pedal unit for vehicles, comprising: a mounting structure having a U-shaped mounting end with spaced parallel leg walls and aligned mounting openings formed in said spaced parallel leg walls, a stationary bearing support sleeve fitted between said spaced parallel leg walls coaxially with said mounting openings so as to be firmly engaged therebetween and to be held axially in position between said leg walls, a slide hub extending from one side of said parallel leg walls through said mounting openings and through said bearing support sleeve for radially supporting said bearing support sleeve between said spaced parallel leg walls, said slide hub having a circumferential wall with resilient projections extending radially therefrom and said bearing support sleeve having cutouts formed therein and sized so as to snugly receive said resilient projections when said slide hub is fully inserted in said bearing support sleeve to thereby hold said slide hub in engagement within said bearing support sleeve and support said bearing support sleeve radially between said spaced parallel leg walls, a pedal lever having at one end an eyepiece with an opening disposed between said spaced parallel leg walls and receiving said bearing support sleeve such that said pedal lever is pivotally supported on said bearing support sleeve between said spaced parallel leg walls and at least one return spring operatively connected between said pedal lever and said mounting structure for biasing said pedal lever away from said mounting structure.

2. A control pedal unit according to claim 1, wherein said bearing sleeve and said slide hub have windows formed in their circumferential walls so as to be in radial alignment with one another, wherein said slide hub is hollow and a sender shaft is disposed within said slide hub wherein said sender shaft includes means for generating electrical shaft position signals for an electronic vehicle control unit and wherein a carrier pin extends through said windows and is connected at its opposite ends to said sender shaft and said pedal lever respectively for transmitting pivot movement of said pedal lever to said sender shaft.

3. A control pedal unit according to claim 1, wherein at least one of said mounting openings in said leg walls includes cut-outs and said slide hub has stubs received in said cut-outs for properly positioning said slide hub in said mounting openings.

4. A control pedal unit according to claim 1, wherein said bearing sleeve has an axial length so as to be tightly received between said leg walls.

* * * * *